United States Patent
Haim et al.

(10) Patent No.: US 11,308,077 B2
(45) Date of Patent: Apr. 19, 2022

(54) IDENTIFYING SOURCE DATASETS THAT FIT A TRANSFER LEARNING PROCESS FOR A TARGET DOMAIN

(71) Applicant: International Business Machines Corporation, Armonk, NY (US)

(72) Inventors: Bar Haim, Ashqelon (IL); Andrey Finkelshtein, Beer Sheva (IL); Eitan Menahem, Beer Sheva (IL); Noga Agmon, Givat Shmuel (IL)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 16/934,492

(22) Filed: Jul. 21, 2020

(65) Prior Publication Data

US 2022/0027339 A1    Jan. 27, 2022

(51) Int. Cl.
*G06F 16/00* (2019.01)
*G06F 16/23* (2019.01)
(Continued)

(52) U.S. Cl.
CPC ........ *G06F 16/2365* (2019.01); *G06F 16/221* (2019.01); *G06F 16/2282* (2019.01);
(Continued)

(58) Field of Classification Search
None
See application file for complete search history.

(56) References Cited

U.S. PATENT DOCUMENTS

| 2011/0087678 A1* | 4/2011 | Frieden ................. G06F 16/954 707/749 |
| 2016/0147765 A1 | 5/2016 | Glover |

(Continued)

FOREIGN PATENT DOCUMENTS

| CN | 107766567 B | 3/2018 |
| CN | 110619535 A | 12/2019 |

OTHER PUBLICATIONS

Fawaz, Hassan Ismail et al., "Transfer Learning for Time Series Classification," IEEE International Conference on Big Data, Nov. 5, 2018, pp. 1367-1376.
(Continued)

*Primary Examiner* — Bai D Vu
(74) *Attorney, Agent, or Firm* — Barry D. Blount (57) ABSTRACT

A method for quantifying a similarity between a target dataset and multiple source datasets and identifying one or more source datasets that are most similar to the target dataset is provided. The method includes receiving, at a computing system, source datasets relating to a source domain and a target dataset relating to a target domain of interest. Each dataset is arranged in a tabular format including columns and rows, and the source datasets and the target dataset include a same feature space. The method also includes pre-processing, via a processor of the computing system, each source-target dataset pair to remove non-intersecting columns. The method further includes calculating at least two of a dataset similarity score, a row similarity score, and a column similarity score for each source-target dataset pair, and summarizing the calculated similarity scores to identify one or more source datasets that are most similar to the target dataset.

20 Claims, 6 Drawing Sheets

(51) Int. Cl.
*G06F 16/22* (2019.01)
*G06K 9/62* (2022.01)
*G06N 20/00* (2019.01)

(52) U.S. Cl.
CPC ....... *G06F 16/2358* (2019.01); *G06K 9/6256* (2013.01); *G06N 20/00* (2019.01)

(56) References Cited

U.S. PATENT DOCUMENTS

| | | | |
|---|---|---|---|
| 2016/0253597 A1 | 9/2016 | Bhatt et al. | |
| 2017/0031953 A1* | 2/2017 | Tang | G06F 16/5838 |
| 2017/0337266 A1 | 11/2017 | Bhatt et al. | |
| 2018/0143960 A1 | 5/2018 | DeLuca et al. | |
| 2018/0218284 A1* | 8/2018 | Jawahar | G06N 3/08 |
| 2018/0373962 A1* | 12/2018 | Ye | G06K 9/00369 |
| 2019/0156178 A1 | 5/2019 | Thornton et al. | |

OTHER PUBLICATIONS

Uguroglu, Selen et al., "Feature Selection for Transfer Learning." Joint European Conference on Machine Learning and Knowledge Discovery in Databases. Springer, Berlin, Heidelberg, 2011, pp. 430-442.

Zhong, Erheng, et al., "Cross Validation Framework to Choose Amongst Models and Datasets for Transfer Learning." Joint European Conference on Machine Learning and Knowledge Discovery in Databases. Springer, Berlin, Heidelberg, 2010, pp. 547-562.

"Written Opinion of the International Searching Authority", dated Sep. 23, 2021, International Application No. PCT/IB2021/055203, 6 pages.

\* cited by examiner

IDENTIFYING SOURCE DATASETS THAT FIT A TRANSFER LEARNING PROCESS FOR A TARGET DOMAIN

BACKGROUND

The present disclosure relates to the field of machine learning and transfer learning. More specifically, the present disclosure relates to identifying one or more source datasets that are similar to a target dataset and, thus, fit a transfer learning process for a target domain.

SUMMARY

According to an embodiment described herein, a method is provided for quantifying a similarity between a target dataset and multiple source datasets and identifying at least one source dataset that is most similar to the target dataset. The method includes receiving, at a computing system, source datasets relating to a source domain and a target dataset relating to a target domain of interest, wherein each dataset is arranged in a tabular format including columns that correspond to features of the dataset and rows that correspond to instances of the dataset, and wherein the source datasets and the target dataset include a same feature space. The method also includes pre-processing, via a processor of the computing system, each source-target dataset pair to remove any non-intersecting columns. The method further includes calculating, via the processor, at least two of a dataset similarity score, a row similarity score, and a column similarity score for each source-target dataset pair, and summarizing, via the processor, the at least two of the dataset similarity score, the row similarity score, and the column similarity score for each source-target dataset pair to identify at least one source dataset that is most similar to the target dataset.

In another embodiment, a computing system is provided. The computing system includes an interface for receiving source datasets relating to a source domain and a target dataset relating to a target domain of interest, wherein each dataset is arranged in a tabular format including columns that correspond to features of the dataset and rows that correspond to instances of the dataset, and wherein the source datasets and the target dataset include a same feature space. The computing system also includes a processor and a computer-readable storage medium storing program instructions that direct the processor to pre-process each source-target dataset pair to remove any non-intersecting columns. The computer-readable storage medium also stores program instructions that direct the processor to calculate at least two of a dataset similarity score, a row similarity score, and a column similarity score for each source-target dataset pair. The computer-readable storage medium further stores program instructions that direct the processor to summarize the at least two of the dataset similarity score, the row similarity score, and the column similarity score for each source-target dataset pair to identify at least one source dataset that is most similar to the target dataset.

In yet another embodiment, a computer program product is provided. The computer program product includes a computer-readable storage medium having program instructions embodied therewith, wherein the computer-readable storage medium is not a transitory signal per se. The program instructions are executable by a processor to cause the processor to receive source datasets relating to a source domain and a target dataset relating to a target domain of interest, wherein each dataset is arranged in a tabular format including columns that correspond to features of the dataset and rows that correspond to instances of the dataset, and wherein the source datasets and the target dataset include a same feature space. The program instructions are also executable by a processor to cause the processor to pre-process each source-target dataset pair to remove any non-intersecting columns. The program instructions are further executable by a processor to cause the processor to calculate at least two of a dataset similarity score, a row similarity score, and a column similarity score for each source-target dataset pair, and summarize the at least two of the dataset similarity score, the row similarity score, and the column similarity score for each source-target dataset pair to identify at least one source dataset that is most similar to the target dataset.

DETAILED DESCRIPTION

Traditional supervised machine learning techniques involve using source datasets to train a model for a specific task and domain. Specifically, the source datasets consist of input data paired with corresponding output data. During the training process, the supervised machine learning algorithm learns by example by searching for patterns in the input data that correlate with the output data. When the training process is complete, the resulting supervised machine leaning model can be used to label or classify new input data relating to the same task and domain.

Such supervised machine learning techniques require a sufficient number of source datasets to train the model for the specific task and domain. Unfortunately, in many real-life scenarios, it is difficult or even impossible to obtain a sufficient number of source datasets for a target domain of interest. However, given a particular target dataset for the target domain, there are often similar source datasets from other related source domains. Therefore, the similar source datasets may be used to perform a transfer learning process for the target domain.

In the machine learning community, transfer learning is the process of transferring knowledge between different domains. More specifically, transfer learning involves applying knowledge and skills learned with respect to a previous source domain for a particular task to a new target domain of interest for the particular task by recognizing commonalities or similarities between the two domains. To successfully apply the transfer learning process to the target domain, suitable source datasets from the source domain must be identified. The source datasets are then used to train an accurate model for the target domain. However, in operation, it is often computationally difficult and time-consuming to identify source datasets that are a good fit for the transfer learning process for the target domain.

Accordingly, the present disclosure describes techniques for identifying source datasets that are similar to a target dataset and, thus, are suitable for training an accurate model for the target domain using a transfer learning process. In other words, given a number of source datasets and a single target dataset, techniques described herein identify one or more source datasets that are most likely to suit a transfer learning process for the target domain. This is accomplished by performing several methods of pairwise comparison between pairs of the source dataset and the target dataset (i.e., "source-target dataset pairs") to generate similarity scores relating to each source-target dataset pair. The similarity scores are then summarized to identify the one or more source datasets that are the most similar to, or closest to, the target dataset. The identified source dataset(s) may then be used for the transfer learning process for the target domain.

In some embodiments, techniques described herein are used for financial fraud detection. For example, banks often use supervised machine learning techniques to train models that can automatically classify transactions, such as credit card payments, as either legitimate or fraudulent based on particular transaction details, such as the payment amount, the merchant, the location, the time, and the like. Such models are effective for large banks, since large banks typically have a sufficient number of labeled instances to accurately train a classifier for their particular task and domain. However, smaller banks often do not have a sufficient number of labeled instances or other resources to take advantage of such supervised machine learning techniques. Moreover, while such banks may be interested in the same task, their domains will likely be somewhat different from those of larger banks, making it difficult or impossible to use the models learned by the larger banks.

Therefore, in some cases, a transfer learning process may be used to apply the knowledge and skills learned with respect to a previous domain and task for a larger bank to a new target domain of interest relating to the same task for a smaller bank. Specifically, the transfer learning process may use source datasets from the previous domain relating to the larger bank to train an accurate classifier for the target domain relating to the smaller bank. However, for the transfer learning process to be successful, particular source datasets from the previous domain that are similar to a target dataset for the target domain must be identified. In various embodiments, this is accomplished using the dataset identification techniques described herein.

Embodiments described herein relate to the use of the dataset identification techniques to aid in financial fraud detection. However, it will be appreciated by one of skill in the art that the dataset identification techniques described herein are useful for any transfer learning task that would benefit from the identification of one or more source datasets that are similar to a target dataset.

Figure 1:
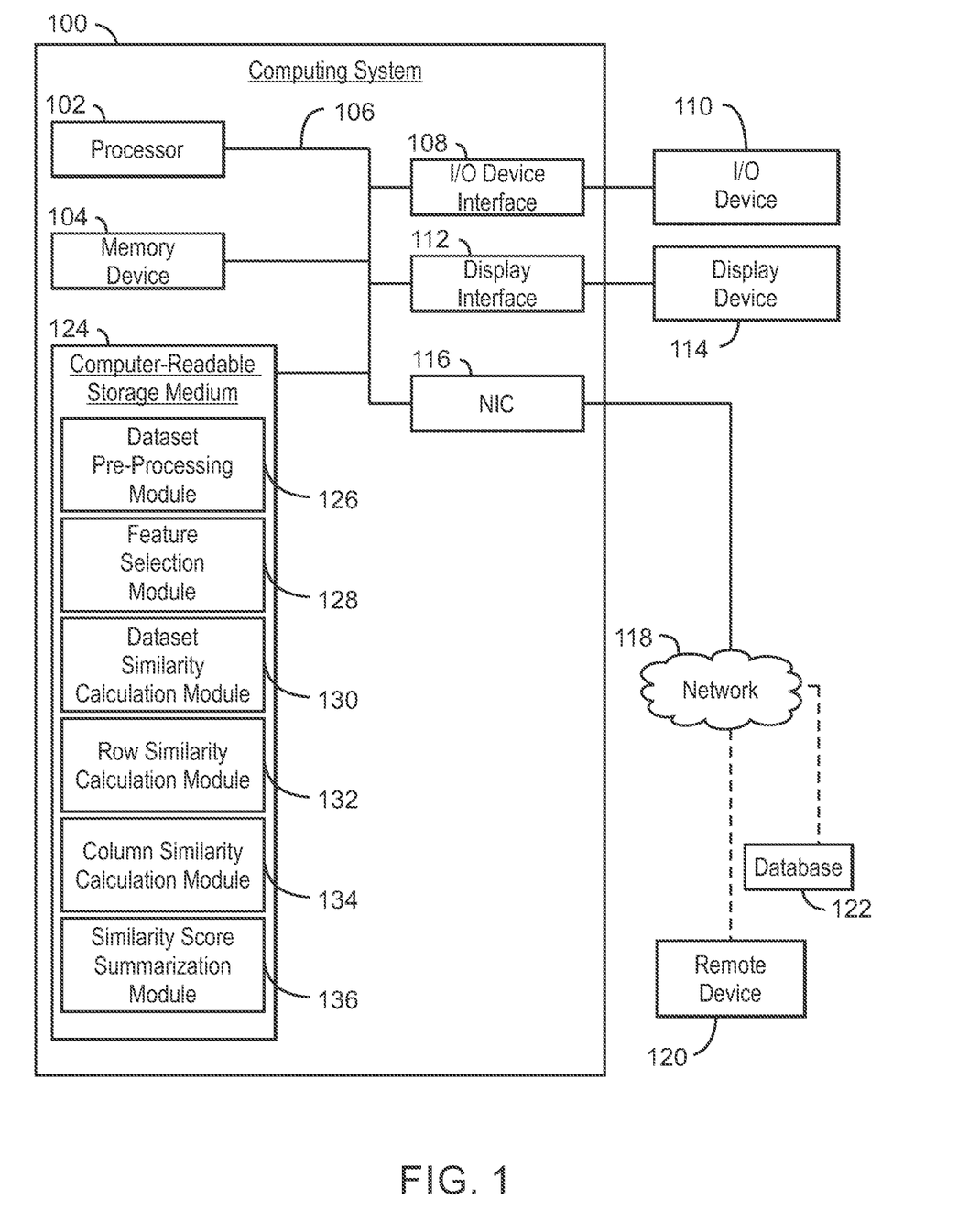
FIG. 1 is a simplified block diagram of an exemplary computing system that can be used to implement the dataset identification techniques described herein.

FIG. 1 is a simplified block diagram of an exemplary computing system 100 that can be used to implement the dataset identification techniques described herein. The computing system 100 may include one or more servers, one or more general-purpose computing devices, one or more special-purpose computing devices, one or more virtual machines, and/or any other suitable type(s) of computing device(s). As an example, the computing system 100 may be a desktop computer, a laptop computer, a tablet computer, or a smartphone. Moreover, in some embodiments, the computing system 100 is a cloud computing node.

The computing system 100 includes a processor 102 that is adapted to execute stored program instructions, such as program modules, as well as a memory device 104 that provides temporary memory space for the program instructions during execution. The processor 102 can include any suitable processing unit or device, such as, for example, a single-core processor, a single-core processor with software multithread execution capability; a multi-core processor, a multi-core processor with software multithread execution capability, a computing cluster, parallel platforms, parallel platforms with shared memory, or any number of other configurations. Moreover, the processor 102 can include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combinations thereof, designed to perform the functions described herein. The memory device 104 can include volatile memory components, nonvolatile memory components, or both volatile and nonvolatile memory components. Nonvolatile memory components may include, for example, read only memory (ROM), programmable ROM (PROM), electrically programmable ROM (EPROM), electrically erasable ROM (EEROM), flash memory, or non-volatile random access memory (RAM) (e.g., ferroelectric RAM (FeRAM). Volatile memory components may include, for example, RAM, which can act as external cache memory. RAM is available in many forms, such as, for example, synchronous RAM (SRAM), dynamic RAM (DRAM), synchronous dynamic RAM (SDRAM), and the like.

In some embodiments, the computing system 100 is practiced in a distributed cloud computing environment where tasks are performed by remote processing devices that are linked through a communications network. In a distributed cloud computing environment, program modules may be located in both local and remote computing devices.

The processor 102 is connected through a system interconnect 106 (e.g., PCI®, PCI-Express®, etc.) to an input/output (I/O) device interface 108 adapted to connect the computing system 100 to one or more I/O devices 110. The I/O devices 110 may include, for example, a keyboard and a pointing device, where the pointing device may include a touchpad or a touchscreen, among others. The I/O devices 110 may be built-in components of the computing system 100, or may be devices that are externally connected to the computing system 100.

The processor 102 is also linked through the system interconnect 106 to a display interface 112 adapted to connect the computing system 100 to a display device 114. The display device 114 may include a display screen that is a built-in component of the computing system 100. The display device 114 may also include a computer monitor, television, or projector, among others, that is externally connected to the computing system 100. In addition, a network interface controller (NIC) 116 is adapted to connect the computing system 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. The network 118 may include associated copper transmission cables, optical transmission fibers, wireless transmission devices, routers, firewalls, switches, gateway computers, edge servers, and the like.

One or more remote devices 120 may optionally connect to the computing system 100 through the network 118. In addition, one or more databases 122 may optionally connect to the computing system 100 through the network 118. In some embodiments, the one or more databases 122 store data relating to machine learning tasks and/or transfer learning tasks. For example, the database(s) 122 may include source datasets from one or more related source domains. In such embodiments, the computing system 100 may access or download at least a portion of the source datasets from a source domain during the dataset identification process described herein.

The computing system 100 also includes a computer-readable storage medium (or media) 124 that includes program instructions that may be executed by the processor 102 to perform various operations, such as the dataset identification process described herein. The computer-readable storage medium 124 may be integral to the computing system 100, or may be an external device that is connected to the computing system 100 when in use. The computer-readable storage medium 124 may include, for example, an electronic storage device, a magnetic storage device, an optical storage device, an electromagnetic storage device, a semiconductor storage device, or any suitable combination of the foregoing. A non-exhaustive list of more specific examples of the computer-readable storage medium 124 includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. Moreover, the term "computer-readable storage medium," as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. In some embodiments, the NIC 116 receives program instructions from the network 118 and forwards the program instructions for storage in the computer-readable storage medium 124 within the computing system 100.

Generally, the program instructions, including the program modules, may include routines, programs, objects, components, logic, data structures, and so on that perform particular tasks or implement particular abstract data types. For example, the program instructions may include assembler instructions, instruction-set-architecture (ISA) instructions, machine instructions, machine-dependent instructions, microcode, firmware instructions, state-setting data, or either source code or object code written in any combination of one or more programming languages, including an object-oriented programming language such as Smalltalk, C++, or the like, and conventional procedural programming languages, such as the "C" programming language or similar programming languages. The program instructions may execute entirely on the computing system 100, partly on the computing system 100, as a stand-alone software package, partly on the computing system 100 and partly on a remote computer or server connected to the computing system 100 via the network 118, or entirely on such a remote computer or server. In some embodiments, electronic circuitry including, for example, programmable logic circuitry, field-programmable gate arrays (FPGA), or programmable logic arrays (PLA) may execute the program instructions by utilizing state information of the program instructions to personalize the electronic circuitry, in order to perform aspects of the techniques described herein.

According to embodiments described herein, the computer-readable storage medium 124 includes program modules for performing the dataset identification process described herein. Specifically, the computer-readable storage medium 124 includes a dataset pre-processing module 126, a feature selection module 128, a dataset similarity calculation module 130, a row similarity calculation module 132, a column similarity calculation module 134, and a similarity score summarization module 136. The manner in which such modules may be executed to perform the dataset identification process described herein is explained further with respect to FIGS. 2-4.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional processors, additional memory components, embedded controllers, additional modules, additional network interfaces, etc.). Furthermore, any of the functionalities relating to the dataset identification process described herein are partially, or entirely, implemented in hardware and/or in the processor 102. For example, such functionalities may be implemented with an ASIC, logic implemented in an embedded controller, and/or in logic implemented in the processor 102, among others. In some embodiments, the functionalities relating to the dataset identification process described herein are implemented with logic, wherein the logic, as referred to herein, can include any suitable hardware (e.g., a processor, among others), software (e.g., an application, among others), firmware, or any suitable combination of hardware, software, and firmware.

Figure 2:
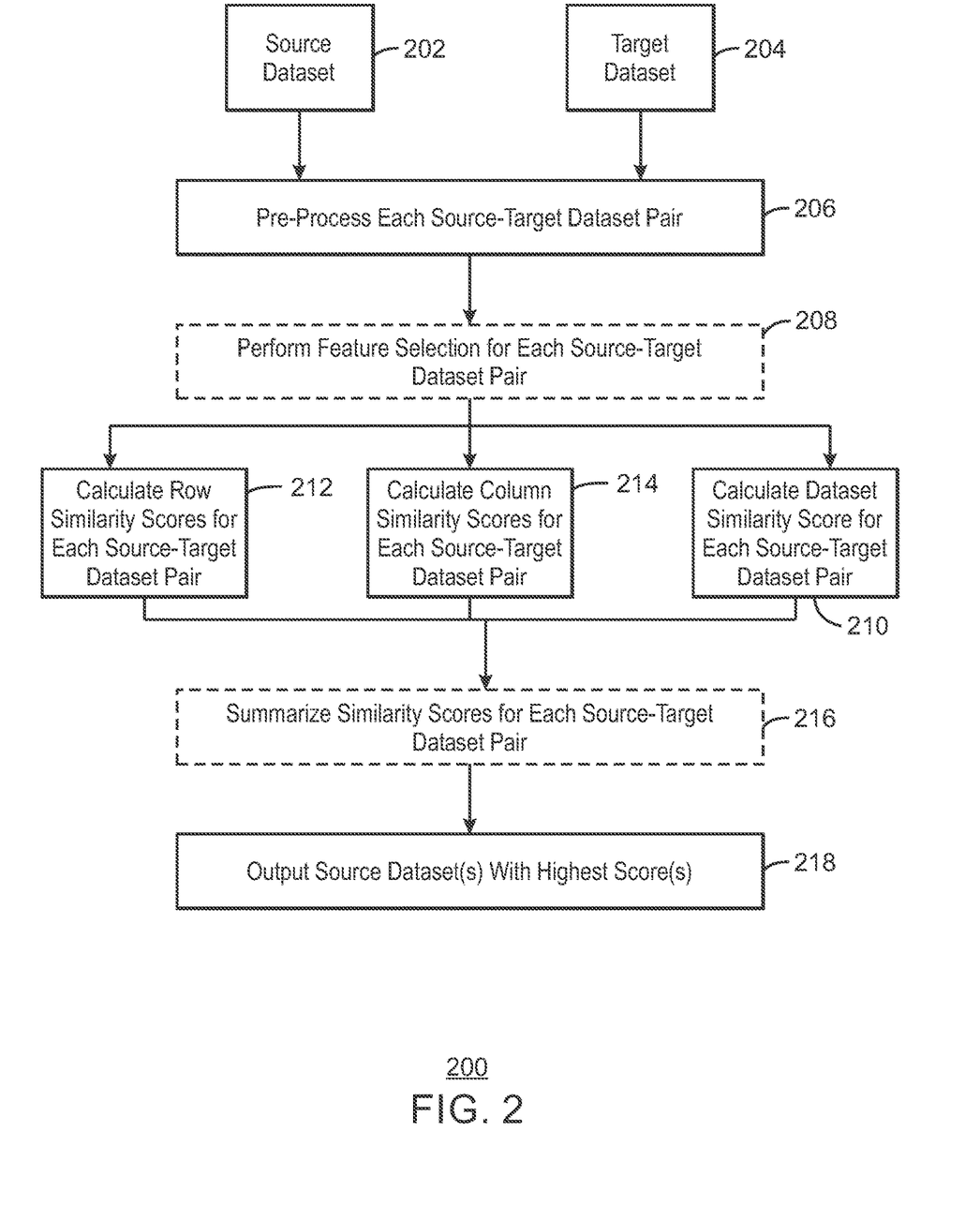
FIG. 2 is a process flow diagram of an exemplary embodiment of the dataset identification process described herein.

FIG. 2 is a process flow diagram of an exemplary embodiment of the dataset identification process 200 described herein. Like numbered items are as described with respect to FIG. 1. In various embodiments, the method 200 is implemented by the computing system 100 described with respect to FIG. 1. In particular, the method 200 may be performed by the processor 102 via the execution of the modules 126-136 within the computer-readable storage medium 124.

According to embodiments described herein, the dataset identification process 200 includes two forms of input: (1) multiple source datasets 202 that relate to a source domain; and (2) a single target dataset 204 that relates to a target domain of interest. In various embodiments, the data within each dataset 202 and 204 are represented as vectors of numeric values that are arranged in a tabular format including a number of rows and a number of columns, where the columns intersect the rows to define individual cells within the table. Each column within a particular dataset represents a feature of the dataset. In addition, each row within a particular dataset represents a single instance of the dataset. Moreover, when the numeric values within each cell of a particular row, i.e., instance, are combined into individual vectors, each vector represents a single feature vector of the dataset. According to embodiments described herein, the dataset identification process 200 assumes that the source datasets 202 and the target dataset 204 are from the same feature space, meaning that a large proportion of the columns within the datasets 202 and 204 are the same or, in other words, the columns are mostly intersecting.

At block 206, each source-target dataset pair is preprocessed. In various embodiments, this involves utilizing standard data pre-processing techniques to prepare the datasets for the dataset identification process 200. In particular, this includes removing non-intersecting columns from the datasets (if any exist) such that the datasets include only intersecting columns. In addition, pre-processing the datasets may include any (or all) of the following steps: (1) filling missing values within the datasets; (2) removing all irrelevant or unimportant columns from the datasets; (3) aligning the datasets such that the intersecting columns are in the same order and, thus, the vectors of numeric values are directly correlated between the datasets; and (4) standardizing the values within the datasets. Moreover, any number of additional or alternative pre-processing steps may be performed, depending on the details of the specific implementation.

At block 208, feature selection is optionally performed for each source-target dataset pair. In some embodiments, feature selection includes identifying and removing the best-splitting columns from each source-target dataset pair. More specifically, for each source-target dataset pair, a predetermined number of columns that split the dataset best are identified and removed. According to embodiments described herein, this is accomplished by first labeling each instance of each source dataset as "0" and each instance of the target dataset as "1". For each source-target dataset pair, a machine learning model is then trained to differentiate between the two datasets. The machine learning model may include, for example, a decision tree model, a deep learning model, a simple classification model, a regression model, or a maze-based model. In various embodiments, the machine learning model for each source-target dataset pair includes a most important feature. The most important feature is the feature that includes the highest level of dissimilarity between the two datasets, which may be domain-related to each dataset. As an example, if the two datasets are from different countries, the most important feature may be the language feature or the country feature. In various embodiments, the manner in which the most important feature is identified varies depending on the type of model used. For example, if the machine learning model is a decision tree model, the model may automatically output various metrics, including a ranking of features by level of importance.

Once the most important feature has been identified, the column corresponding to the most important feature is removed from both datasets within the source-target dataset pair. According to embodiments described herein, the column corresponding to the most important feature is referred to as the "best-splitting column," since it is the column that includes the most dissimilar (or the most separating) values between the two datasets. Moreover, removing the best-splitting column causes the datasets to become more similar and, thus, makes the overall machine learning task more difficult.

After the best-splitting column has been removed, the machine learning model is retrained to differentiate between the two datasets. This process of training the machine learning model and then removing the best-splitting column is repeated for a predetermined number, k, of iterations. Therefore, once this iterative process is completed for each source-target dataset pair, the source datasets and the target dataset have been filtered to remove the predetermined number, k, of best-splitting columns. The dataset identification process 200 may then proceed to the similarity calculation steps of blocks 210-214 using the filtered datasets.

In various embodiments, the value of k varies depending on the number of intersecting columns within the datasets. For example, the value of k may be equal to around 10% of the total number of intersecting columns. As a more specific example, if the datasets include 1,000 intersecting columns, a total of around 100 best-splitting columns may be removed. Moreover, in some embodiments, more than one best-splitting column is removed during each iteration. For example, around 2-10 best-splitting columns may be removed during each iteration. Using the same example, 10-50 iterations may then be used to remove a total of 100 best-splitting columns from the datasets. Therefore, in such embodiments, the predetermined number of iterations may be denoted as n, while the predetermined number of best-splitting columns may be denoted as k.

In other embodiments, feature selection includes filtering out columns in which the distribution of values is most dissimilar between the source dataset and the target dataset within each source-target dataset pair. In some embodiments, this is accomplished by building a value distribution approximation, such as a distribution histogram, for the values of each column within the source dataset and each column within the target dataset. The value distribution approximation for a particular column of the source dataset may then be compared to the value distribution approximation for the corresponding column of the target dataset. This comparison may be accomplished using any suitable similarity function, such as, for example, the Pearson correlation function, the cosine similarity function, or the Euclidean distance function. In various embodiments, a threshold is set for the similarity function, such as, for example, a threshold on bins of >0.3 if the Pearson correlation function is used. In this manner, the columns that are most dissimilar are filtered out of each source-target dataset pair, resulting in the remaining columns, or features, being selected for the dataset identification process 200. In other embodiments, instead of setting a threshold for the similarity function, a predetermined percentage of the columns with the lowest distribution similarity score are filtered out, and the remaining columns, or features, are used for the dataset identification process 200.

As another example, in embodiments in which the source datasets are labeled, feature selection may include using existing feature selection methods to select features based on the features' relative importance for solving the machine learning task for each source-target dataset pair. Examples of such methods include correlation-based feature selection, information-gain-based feature selection, and learner-based feature selection. In such embodiments, once the features are ranked by importance, the columns corresponding to the least important features are filtered out of the datasets, and the remaining columns, or features, are used for the dataset identification process 200.

At block 210, a dataset similarity score is calculated for each source-target dataset pair. In embodiments in which feature selection at block 208 includes identifying the best-splitting columns within each source-target dataset pair, the output of block 208 may be used to calculate the dataset similarity score for each source-target dataset pair. In some embodiments, the process of training the machine learning model and then removing the best-splitting columns may be repeated for a predetermined number of additional iterations, in addition to the k iterations performed at the feature selection stage of block 208. In such embodiments, the output of block 208, in combination with the output obtained from the predetermined number of additional iterations, may be used to calculate the dataset similarity score for each source-target dataset pair. Moreover, in embodiments in which the best-splitting columns within each source-target dataset pair are not identified at block 208, the iterative best-splitting column identification process described with respect to block 208 is performed at block 210. For each source-target dataset pair, the output of this iterative process is a machine learning model for each iteration, where each machine learning model has been trained to split between the two datasets within the source-target dataset pair after removing one or more best-splitting columns during the particular iteration.

For each source-target dataset pair, the results of the machine learning model from each iteration may then be analyzed by, for example, checking general metrics relating to the model. If the machine learning model for a particular iteration produces low-quality results, this means that the model was unable to differentiate between the two datasets and, thus, the two datasets include values that are relatively similar. Conversely, if the machine learning model produces high-quality results, this means that the model was able to effectively differentiate between the two datasets and, thus, the two datasets include values that are relatively dissimilar. According to embodiments described herein, this concept is utilized to generate a dataset similarity score for each source-target dataset pair. This is accomplished by first determining the overall accuracy of the machine learning models for the source-target dataset pair, where the term "accuracy" refers to the ratio of the number of correct predictions made by a model compared to the total number of predictions made by the model. In various embodiments, the models' overall accuracy can be determined using any suitable type of evaluation metric relating to machine learning problems. For example, the models' overall accuracy may be determined by calculating the average accuracy of all the models generated for the particular source-target dataset pair, or by calculating the area-under-the-curve (AUC) score of the model generated during the final iteration of the process.

A dataset similarity score is then calculated for each source-target dataset pair, where the dataset similarity score is equal to (1—overall accuracy). Since a higher overall accuracy means that the datasets are less similar, a lower dataset similarity score also means that the datasets are less similar. As a result, the source-target dataset pairs with the highest dataset similarity scores are the most similar according to the pairwise comparison method of block 210.

At block 212, row similarity scores are calculated for each source-target dataset pair. In various embodiments, this is accomplished by calculating a distance score between each instance of the target dataset and each instance of each source dataset. In operation, the distance scores may be calculated by comparing the feature vectors within each source-target dataset pair. Next, the distance scores for each instance of each source-target dataset pair are ranked and summarized to find the average (or the weighted average) of a predetermined percentage, such as, for example, 5%, of the maximum distance scores for each source-target dataset pair. The resulting average minimum distance score for each source-target dataset pair is then output as the row similarity score for the source-target dataset pair.

In various embodiments, this pairwise comparison method can be computationally difficult and time-consuming since each instance within each dataset must be compared. Therefore, according to embodiments described herein, a clustering-based optimization process may be used to perform the pairwise comparison more quickly and efficiently. In various embodiments, the clustering-based optimization process involves performing several steps for each source-target dataset pair. First, the cluster center for each instance of each source dataset is calculated using a clustering algorithm, such as, for example, the k-means clustering algorithm (also referred to as Lloyd's algorithm). Each feature vector for each source dataset is then notated with the closest center. Second, the closest center for each instance of the target dataset is calculated. Third, the minimum distance is calculated between each feature vector within the target dataset and each feature vector from the source datasets that lies on the closest cluster. Only calculating the minimum distances for the feature vectors from the source datasets that lie on the closest clusters removes unnecessary computations and, thus, saves time. Fourth, the distance summarization steps described above are performed to find the average minimum distance score for each source-target dataset pair, which is equal to the row similarity score for the source-target dataset pair.

At block 214, column similarity scores are calculated for each source-target dataset pair. Specifically, since the source datasets and the target dataset include corresponding columns, similarity scores for each source-target dataset pair are calculated on a column-by-column basis. In various embodiments, such similarity scores are calculated by building a value distribution approximation, such as a distribution histogram, for the values of each column. The value distribution approximation for a particular column of the source dataset may then be compared to the value distribution approximation for the corresponding column of the target dataset. This comparison may be accomplished using any suitable similarity function, such as, for example, the Pearson correlation function, the cosine similarity function, or the Euclidean distance function. The resulting similarity scores for the corresponding columns within each source-target dataset pair are then summarized to output a single column similarity score for each source-target dataset pair. Moreover, it will be appreciated by one of skill in the art that, while embodiments are described herein with respect to the use of distribution histograms for calculating the column similarity scores, any number of other suitable value distribution approximations may also be used to calculate the column similarity scores.

In some embodiments, the similarity scores for the columns are summarized by finding the average of all the similarity scores. In other embodiments, the similarity scores for the columns are summarized by finding the weighted average of all the similarity scores, where the weights are determined based on the relative importance of each column. In such embodiments, if the source datasets are labeled, then existing feature ranking methods based on the task for the source domain may be used to determine the weight for each feature. Examples of such existing feature ranking methods include information-gain techniques and analysis of variance (ANOVA) techniques. Alternatively, if the source datasets are not labeled, any suitable heuristic process, such as, for example, a heuristic process that utilizes an entropy metric, may be used to determine weights for the features. In various embodiments, summarizing the similarity scores by calculating weighted averages in this manner allows more important features to have a larger impact on whether the datasets are similar. Moreover, in other embodiments, any number of other techniques may also be utilized to summarize the similarity scores for the columns such that a single column similarity score is obtained for each source-target dataset pair.

In some embodiments, two of the similarity calculation steps of blocks 210-214 are performed for each implementation of the dataset identification process 200. For example, in some embodiments, only dataset similarity scores and row similarity scores are calculated. In other embodiments, only row similarity scores and column similarity scores are calculated. In other embodiments, only dataset similarity scores and column similarity scores are calculated. Moreover, in other embodiments, only one of the similarity calculation steps of blocks 210-214 is performed for each implementation of the dataset identification process 200. Furthermore, in other embodiments, all three of the similarity calculation steps of blocks 210-214 are performed for each implementation of the dataset identification process 200.

In various embodiments, the computer-readable storage medium 124 includes program instructions, e.g., a program module, (not shown) that direct the processor 102 to determine which similarity calculation steps to perform for each implementation of the dataset identification process 200. In some embodiments, this determination may be based on, for example, a general evaluation of the source datasets and the target dataset, a type of task to be performed, and/or a predicted accuracy of each type of similarity score. Moreover, in some embodiments, the computer-readable storage medium 124 also (or alternatively) includes program instructions (not shown) that direct the processor 102 to determine which similarity scores to use for the summarization step described with respect to block 216. For example, in some embodiments, all three similarity scores may be calculated at blocks 210-214; however, the processor 102 may select only two of the calculated similarity scores to be used for the summarization step if the processor 102 determines that the other similarity score is not highly relevant or highly accurate.

At block 216, the similarity scores from blocks 210, 212, and/or 214 are summarized for implementations of the dataset identification process 200 in which at least two of the similarity calculation steps of blocks 210-214 are performed. In other words, the dataset similarity score, the row similarity score, and/or the column similarity score for each source-target dataset pair are combined to find an overall similarity score between each source-target dataset pair. In some embodiments, this includes normalizing the dataset similarity score, the row similarity score, and/or the column similarity score for each source-target dataset pair, and then simply summing the scores to determine the overall similarity score for the source-target dataset pair. In other embodiments, this includes finding the mean similarity score, the median similarity score, and/or the maximal similarity score for each source-target dataset pair. In other embodiments, this includes finding the weighted average of the dataset similarity score, the row similarity score, and/or the column similarity score for each source-target dataset pair. In other embodiments, this includes using an aggregation function to determine the overall similarity score for each source-target dataset pair based on the corresponding dataset similarity score, row similarity score, and/or column similarity score. Moreover, it will be appreciated by one of skill in the art that any suitable summarization technique may be used to summarize the similarity scores, depending on the details of the specific implementation.

At block 218, the dataset identification process 200 outputs the source dataset(s) with the highest score(s). For example, in some embodiments, the dataset identification process 200 outputs a list of source datasets with the highest overall similarity scores, and/or a ranking of the source datasets by overall similarity score. In some embodiments, the processor 102 of the computing system 100 causes the list or ranking to be displayed to a user via the display device 114 and/or to one or more remote users of the one or more remote devices 120 via the network 118. For example, the list or ranking may be displayed as one or more charts, diagrams, and/or graphs. Displaying the list or ranking to the user may facilitate the user's selection of one or more source datasets with the highest overall similarity score(s) to be used for the transfer learning process for the target domain.

In other embodiments, the computer-readable storage medium 124 includes program instructions (not shown) that direct the processor 102 to autonomously select a specified number of source datasets with the highest overall similarity scores to be used for the transfer learning process for the target domain. The specified number of source datasets may be, for example, around 2-5 source datasets, depending on the details of the specific implementation. In some embodiments, the processor 102 of the computing system 100 causes one or more charts, diagrams, and/or graphs to be displayed to the user to provide an explanation of the autonomous selection.

The block diagram of FIG. 2 is not intended to indicate that the blocks 206-218 of the dataset identification process 200 are to be executed in any particular order, or that all of the blocks 206-218 of the dataset identification process 200 are to be included in every case. Moreover, any number of additional blocks may be included within the dataset identification process 200, depending on the details of the specific implementation. For example, in some embodiments, the dataset identification process 200 includes using the selected source dataset(s) with the highest overall similarity score(s) to train a classification model for the target domain using a transfer learning process. Specifically, the selected source dataset(s) may be used to train the classifier for the classification model.

Figure 3:
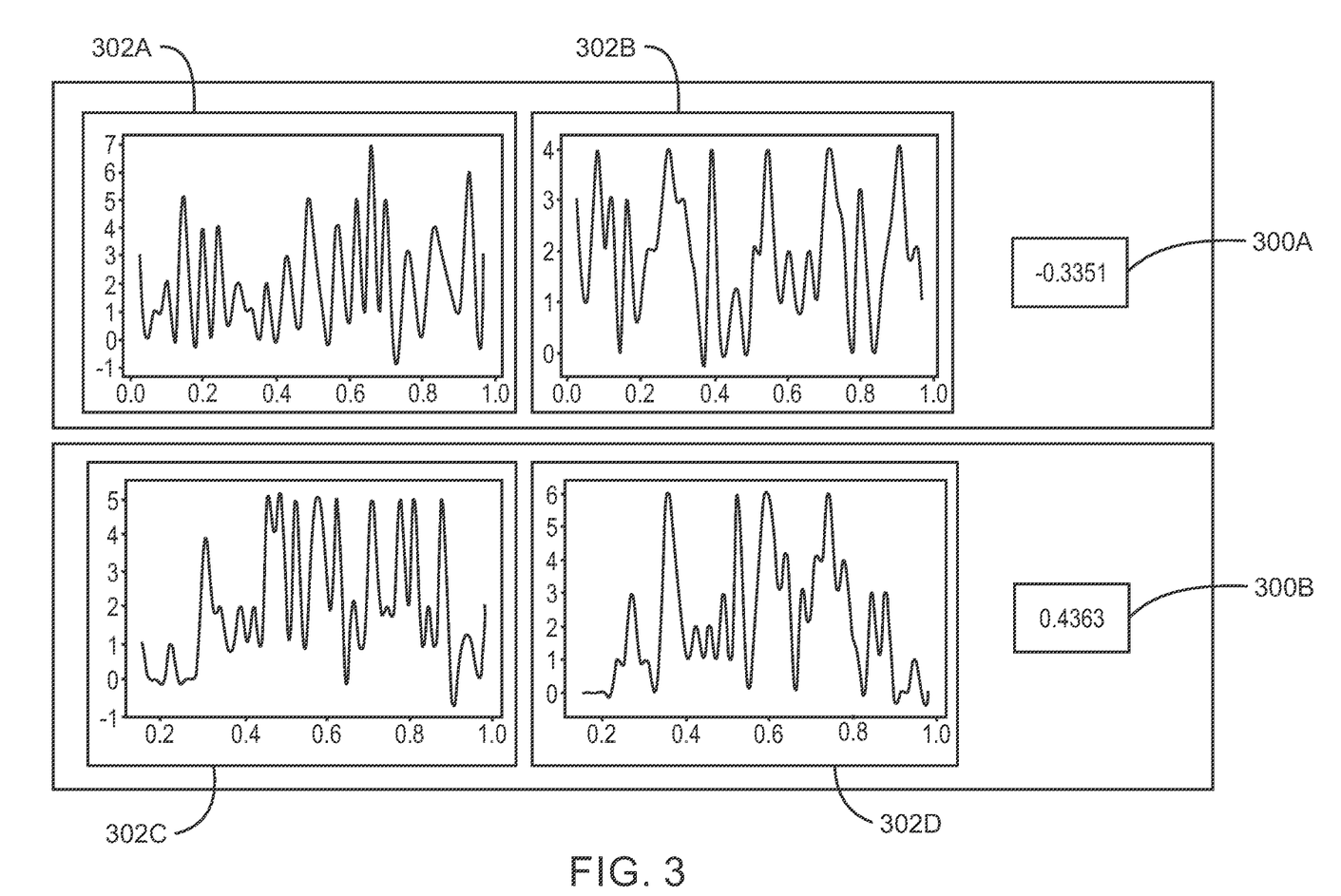
FIG. 3 is a graphical representation showing how exemplary similarity scores may be calculated using distribution histograms in conjunction with the Pearson correlation function.

FIG. 3 is a graphical representation showing how exemplary similarity scores 300A and 300B may be calculated using distribution histograms 302A-D in conjunction with the Pearson correlation function. According to the example shown in FIG. 3, the distribution histograms 302A and 302B, as well as the distribution histograms 302C and 302D, are built using corresponding columns within a source dataset and the target dataset. In other words, the distribution histograms 302A and 302B, and the distribution histograms 302C and 302D, relate to the same feature. The Pearson correlation function is then used to compare the distribution histograms 302A and 302B, as well as the distribution histograms 302C and 302D. The Pearson correlation function then outputs similarity scores 300A and 300B for the two columns, where similarity scores that are closer to 1 indicate that the columns are more similar. As shown in FIG. 3, the distribution histograms 302C and 302D have a similarity score 300A of 0.4363, while the distribution histograms 302A and 302B have a similarity score 300A of −0.3351. Therefore, the columns relating to the distribution histograms 302C and 302D are relatively similar, while the columns relating to the distribution histograms 302A and 302B are highly dissimilar.

Figure 4:
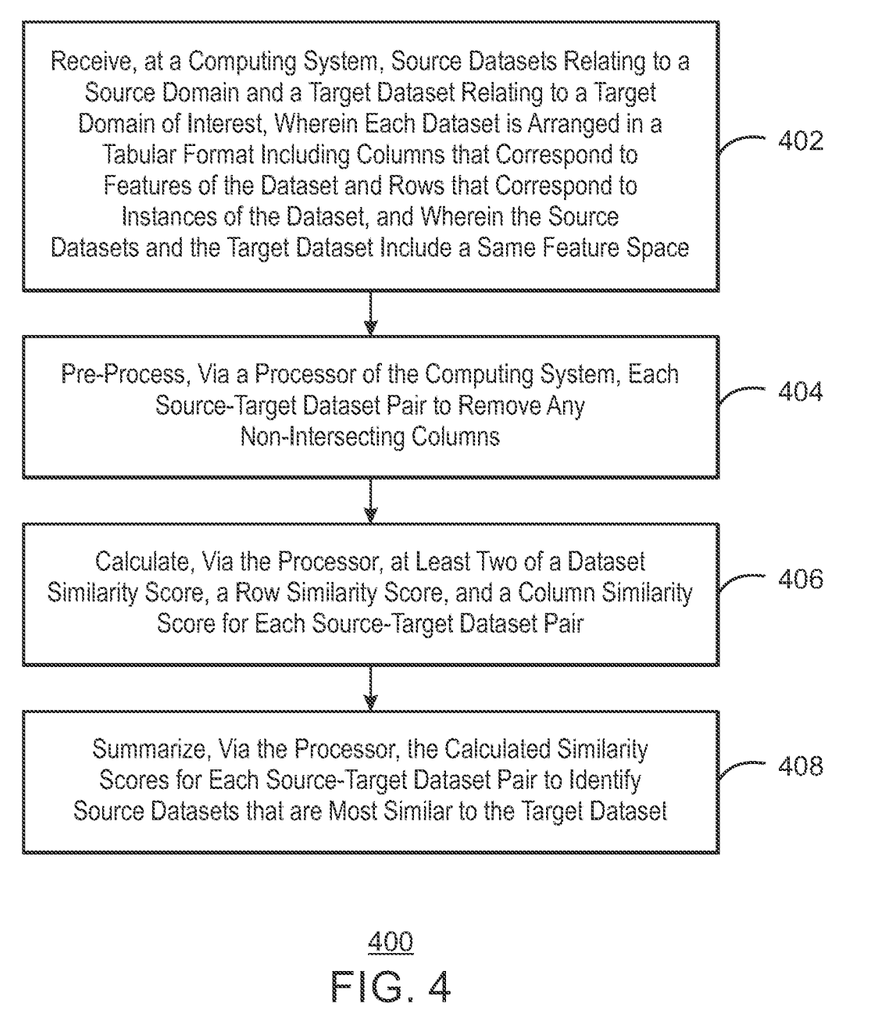
FIG. 4 is a simplified process flow diagram of a method for quantifying the similarity between a target dataset and multiple source datasets and identifying one or more source datasets that are most similar to the target dataset.

FIG. 4 is a simplified process flow diagram of a method 400 for quantifying a similarity between a target dataset and multiple source datasets and identifying one or more source datasets that are most similar to the target dataset. In various embodiments, the method 400 is implemented by the computing system 100 described with respect to FIG. 1. In particular, the method 400 may be performed by the processor 102 via the execution of the modules 126-136 within the computer-readable storage medium 124.

The method 400 begins at block 402, at which source datasets relating to a source domain and a target dataset relating to a target domain of interest are received at the computing system. Each dataset is arranged in a tabular format including columns that correspond to features of the dataset and rows that correspond to instances of the dataset. In addition, the source datasets and the target dataset include a same feature space. Moreover, in various embodiments, the source domain and the target domain relate to the same task, such as, for example, financial fraud detection.

At block 404, each source-target dataset pair is pre-processed via a processor of the computing system to remove any non-intersecting columns. In some embodiments, each source-target dataset pair is also pre-processed to fill missing values, remove any irrelevant or unimportant columns, align the datasets such that the columns are in the same order, and/or standardize values within the datasets.

At block 406, at least two of a dataset similarity score, a row similarity score, and a column similarity score are calculated for each source-target dataset pair via the processor. In various embodiments, calculating the dataset similarity score for each source-target dataset pair includes iteratively performing the following for each source-target dataset pair until a predetermined number of best-splitting columns have been removed from the source-target dataset pair: (1) training a machine learning model to differentiate between the source dataset and the target dataset within the source-target dataset pair; (2) identifying one or more most important features for the machine learning model, wherein each of the one or more most important features corresponds to a best-splitting column within the source-target dataset pair; and (3) removing the one or more best-splitting columns corresponding to the one or more most important features from each source-target dataset pair. In addition, calculating the dataset similarity score for each source-target dataset pair includes performing the following for each source-target dataset pair after the predetermined number of best-splitting columns have been removed: (1) determining an overall accuracy of the machine learning models that were generated during each iteration; and (2) calculating the dataset similarity score for the source-target dataset pair, wherein the dataset similarity score is equal to 1 minus the overall accuracy of the machine learning models, and wherein dataset similarity scores closer to 1 indicate that the source dataset and the target dataset are more similar. In addition, in various embodiments, calculating the row similarity score includes performing the following for each source-target dataset pair: (1) calculating a distance score between each instance of the target dataset and each instance of the source dataset by performing a clustering-based optimization process; (2) summarizing the distance scores to find an average minimum distance score for the source-target dataset pair; and (3) outputting the average minimum distance score as the row similarity score for the source-target dataset pair. Furthermore, in various embodiments, calculating the column similarity score for each source-target dataset pair includes performing the following for each source-target dataset pair: (1) building a value distribution approximation, such as a distribution histogram, for each column within the source dataset and for each column within the target dataset; (2) comparing the value distribution approximations for corresponding columns within the source dataset and the target dataset using a similarity function, wherein an output of the similarity function is a similarity score for each corresponding column; and (3) summarizing the similarity scores for the corresponding columns to find the column similarity score for the source-target dataset pair.

At block 408, the calculated similarity scores for each source-target dataset pair are summarized via the processor to identify one or more source datasets that are most similar to the target dataset. In various embodiments, this includes finding a sum, a mean, a median, a maximum, a weighted average, an aggregation, or another summarization statistic of the calculated similarity scores for each source-target dataset pair, and outputting the sum, the mean, the median, the maximum, the weighted average, the aggregation, or the other summarization statistic of the calculated similarity scores as an overall similarity score for each source-target dataset pair.

The block diagram of FIG. 4 is not intended to indicate that the blocks 402-408 of the method 400 are to be executed in any particular order, or that all of the blocks 402-408 of the method 400 are to be included in every case. Moreover, any number of additional blocks may be included within the method 400, depending on the details of the specific implementation. For example, in some embodiments, the method 400 also includes training a classification model via a transfer learning process for the target domain using at least one source dataset that is most similar to the target dataset. Furthermore, in some embodiments, the method 400 includes displaying a list or ranking of the source datasets that are most similar to the target dataset via a display device of the computing system. This may facilitate the user's selection of one or more source datasets to use for the transfer learning process. In other embodiments, the computing system autonomously selects one or more source datasets to use for the transfer learning process, and optionally displays one or more charts, diagrams, and/or graphs to the user to provide an explanation of the autonomous selection.

In various embodiments, the method 400 also includes performing, via the processor, feature selection for each source-target dataset pair prior to calculating the at least two of the dataset similarity score, the row similarity score, and the column similarity score for each source-target dataset pair. In some embodiments, performing feature selection includes iteratively performing the following for each source-target dataset pair until a predetermined number of best-splitting columns have been removed from the source-target dataset pair: (1) training a machine learning model to differentiate between the source dataset and the target dataset within the source-target dataset pair; (2) identifying one or more most important features for the machine learning model, wherein each of the one or more most important features corresponds to a best-splitting column within the source-target dataset pair; and (3) removing the one or more best-splitting columns corresponding to the one or more most important features from each source-target dataset pair. In addition, in such embodiments, performing feature selection includes identifying the remaining columns within the source-target dataset pair as the selected features. Moreover, in such embodiments, the results of the feature selection process may be used for calculating the dataset similarity scores for the source-target dataset pairs, thus simplifying the overall dataset similarity score calculation process.

The present invention may be a computing system, a method, and/or a computer program product. The computer program product may include a computer-readable storage medium (or media) having computer-readable program instructions thereon for causing a processor to carry out aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

Figure 5:
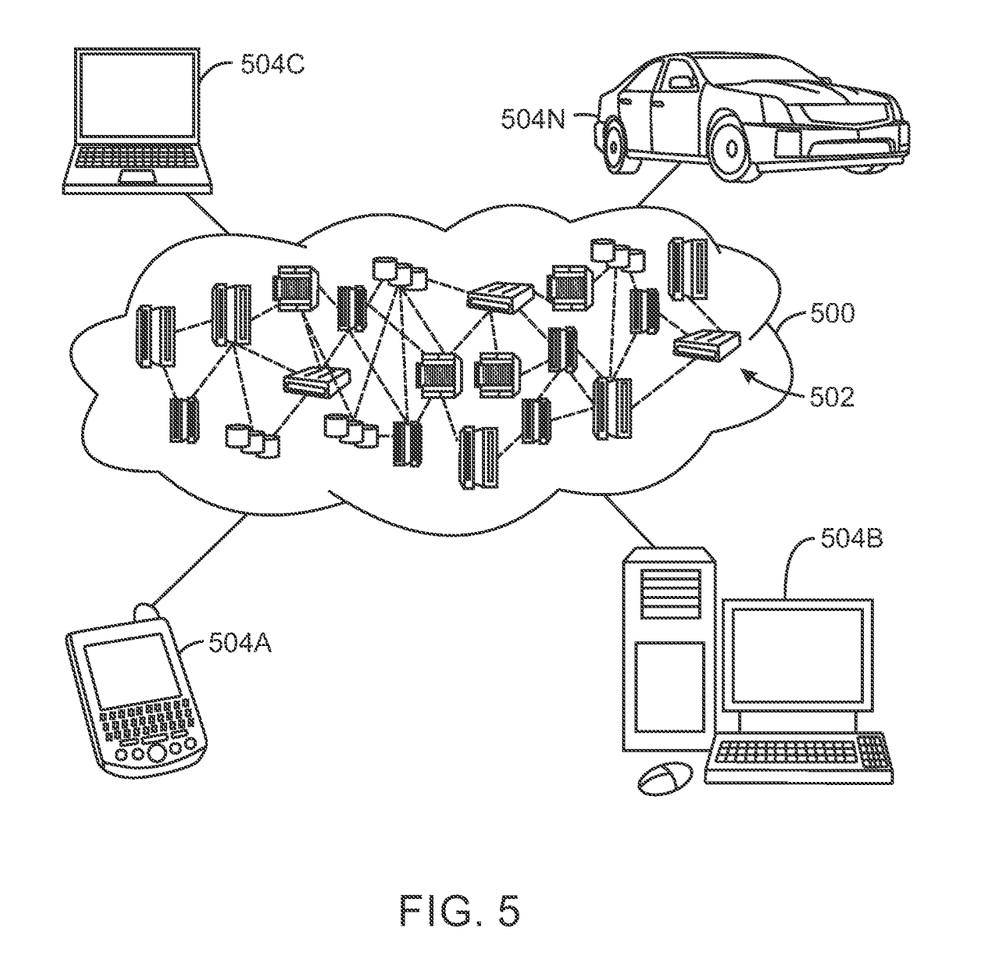
FIG. 5 is a schematic view of an exemplary cloud computing environment.
Figure 6:
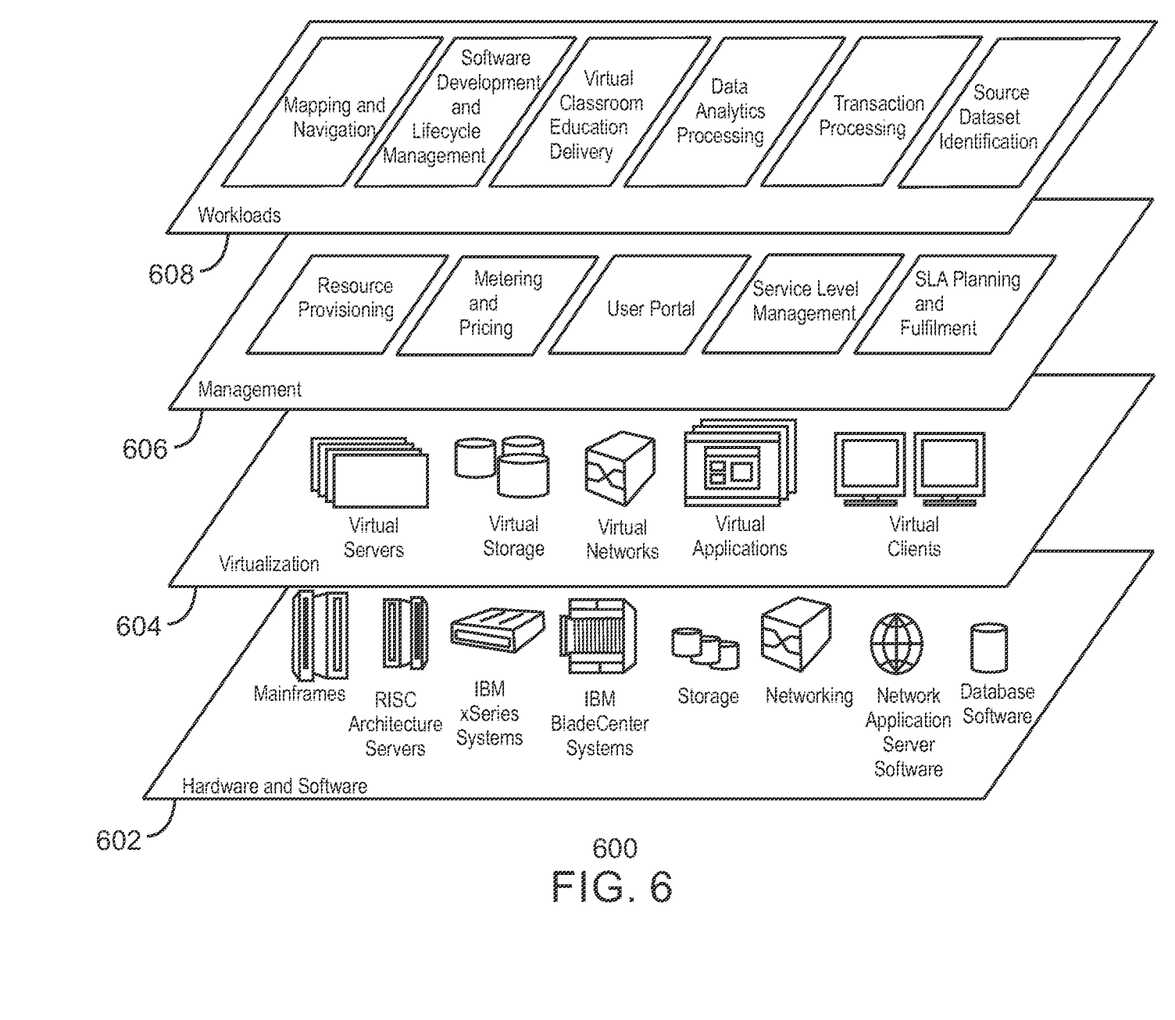
FIG. 6 is a simplified schematic view of exemplary functional abstraction layers provided by the cloud computing environment shown in FIG. 5.

In some scenarios, the techniques described herein may be implemented in a cloud computing environment, as described in more detail with respect to FIGS. 5 and 6. It is understood in advance that although this disclosure may include a description of cloud computing, implementation of the techniques described herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing units, memory, storage devices, applications, virtual machines, and services) that can be rapidly provisioned and released with minimal management effort or interaction with a provider of the service. This cloud model may include at least five characteristics, at least three service models, and at least four deployment models.

The at least five characteristics are as follows:

(1) On-demand self-service: A cloud consumer can unilaterally provision computing capabilities, such as server time and network storage, as needed automatically without requiring human interaction with the service's provider.

(2) Broad network access: Capabilities are available over a network and accessed through standard mechanisms that promote use by heterogeneous thin or thick client platforms (e.g., mobile phones, laptops, and PDAs).

(3) Resource pooling: The provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

(4) Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

(5) Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The at least three service models are as follows:

(1) Software as a Service (SaaS): The capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

(2) Platform as a Service (PaaS): The capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

(3) Infrastructure as a Service (IaaS): The capability provided to the consumer is to provision processing, storage, networks, and other fundamental computing resources, where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The at least four deployment models are as follows:

(1) Private cloud: The cloud infrastructure is operated solely for an organization. It may be managed by the organization or a third party and may exist on-premises or off-premises.

(2) Community cloud: The cloud infrastructure is shared by several organizations and supports a specific community that has shared concerns (e.g., mission, security requirements, policy, and compliance considerations). It may be managed by the organizations or a third party and may exist on-premises or off-premises.

(3) Public cloud: The cloud infrastructure is made available to the general public or a large industry group and is owned by an organization selling cloud services.

(4) Hybrid cloud: The cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure including a network of interconnected nodes.

FIG. 5 is a schematic view of an exemplary cloud computing environment 500. As shown, cloud computing environment 500 includes one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. The cloud computing nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that the cloud computing nodes 502 and cloud computing environment 500 can communicate with any type of computerized device over any type of network and/or network addressable connection (e.g., using a web browser).

FIG. 6 is a simplified schematic view of exemplary functional abstraction layers 600 provided by the cloud computing environment 500 shown in FIG. 5. It should be understood in advance that the components, layers, and functions shown in FIG. 6 are intended to be illustrative only and embodiments of the invention are not limited thereto. As depicted, the following layers and corresponding functions are provided.

Hardware and software layer 602 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 604 provides an abstraction layer from which the following examples of virtual entities may be provided: virtual servers; virtual storage; virtual networks, including virtual private networks; virtual applications and operating systems; and virtual clients. In one example, management layer 606 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 608 provides examples of functionality for which the cloud computing environment may be utilized. Examples of workloads and functions which may be provided from this layer include: mapping and navigation; software development and lifecycle management; virtual classroom education delivery; data analytics processing; transaction processing; and executing source dataset identification techniques.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for quantifying a similarity between a target dataset and multiple source datasets and identifying at least one source dataset that is most similar to the target dataset, comprising:
    receiving, at a computing system, source datasets relating to a source domain and a target dataset relating to a target domain of interest, wherein each dataset is arranged in a tabular format comprising columns that correspond to features of the dataset and rows that correspond to instances of the dataset, wherein the source datasets and the target dataset comprise a same feature space, and wherein each source dataset is paired with the target dataset as part of a source-target dataset pair;
    pre-processing, via a processor of the computing system, each source-target dataset pair to remove any non-intersecting columns;
    calculating, via the processor, at least two of a dataset similarity score, a row similarity score, and a column similarity score for each source-target dataset pair; and
    summarizing, via the processor, the at least two of the dataset similarity score, the row similarity score, and the column similarity score for each source-target dataset pair to identify at least one source dataset that is most similar to the target dataset, wherein the summarizing comprises:
        finding a summarization statistic of the at least two of the dataset similarity score, the row similarity score, and the column similarity score for each source-target dataset pair; and
        outputting the summarization statistic as an overall similarity score for each source-target dataset pair.

2. The method of claim 1, comprising training a classification model for the target domain via a transfer learning process that utilizes the at least one source dataset that is most similar to the target dataset.

3. The method of claim 1, wherein pre-processing each source-target dataset pair further comprises at least one of:
    filling missing values within each source-target dataset pair;

removing any irrelevant or unimportant columns from each source-target dataset pair;

aligning the source dataset and the target dataset within each source-target dataset pair to provide the columns of the source dataset and the columns of the target dataset arranged in a same order; and standardizing values within each source-target dataset pair.

4. The method of claim 1, comprising performing, via the processor, feature selection for each source-target dataset pair prior to calculating the at least two of the dataset similarity score, the row similarity score, and the column similarity score for each source-target dataset pair.

5. The method of claim 4, wherein performing feature selection for each source-target dataset pair comprises:
   iteratively performing the following for each source-target dataset pair until a predetermined number of best-splitting columns have been removed from the source-target dataset pair:
      training a machine learning model to differentiate between the source dataset and the target dataset within the source-target dataset pair;
      identifying one or more most important features for the machine learning model, wherein each of the one or more most important features corresponds to a best-splitting column within the source-target dataset pair; and
      removing the one or more best-splitting columns corresponding to the one or more most important features from the source-target dataset pair; and
   identifying the remaining columns within each source-target dataset pair as the selected features.

6. The method of claim 1, wherein calculating the dataset similarity score for each source-target dataset pair comprises, for each source-target dataset pair:
   iteratively performing the following for the source-target dataset pair until a predetermined number of best-splitting columns have been removed from the source-target dataset pair:
      training a machine learning model to differentiate between the source dataset and the target dataset within the source-target dataset pair;
      identifying one or more most important features for the machine learning model, wherein each of the one or more most important features corresponds to a best-splitting column within the source-target dataset pair; and
      removing the one or more best-splitting columns corresponding to the one or more most important features from the source-target dataset pair;
   determining an overall accuracy of the machine learning models that were generated during each iteration; and
   calculating the dataset similarity score for the source-target dataset pair, wherein the dataset similarity score is equal to 1 minus the overall accuracy of the machine learning models, and wherein dataset similarity scores closer to 1 indicate that the source dataset and the target dataset are more similar.

7. The method of claim 1, wherein calculating the row similarity score for each source-target dataset pair comprises, for each source-target dataset pair:
   calculating a distance score between each instance of the target dataset and each instance of the source dataset by performing a clustering-based optimization process;
   summarizing the distance scores to find an average minimum distance score for the source-target dataset pair; and outputting the average minimum distance score as the row similarity score for the source-target dataset pair.

8. The method of claim 1, wherein calculating the column similarity score for each source-target dataset pair comprises, for each source-target dataset pair:
   building a value distribution approximation for each column within the source dataset and each column within the target dataset;
   comparing the value distribution approximations for corresponding columns within the source dataset and the target dataset using a similarity function, wherein an output of the similarity function is a similarity score for each corresponding column; and
   summarizing the similarity scores for the corresponding columns to find the column similarity score for the source-target dataset pair.

9. The method of claim 1, wherein finding the summarization statistic of the at least two of the dataset similarity score, the row similarity score, and the column similarity score for each source-target dataset pair comprises:
   finding a sum, a mean, a median, a maximum, a weighted average, or an aggregation of the at least two of the dataset similarity score, the row similarity score, and the column similarity score for each source-target dataset pair; and
   outputting the sum, the mean, the median, the maximum, the weighted average, or the aggregation as an overall similarity score for each source-target dataset pair.

10. A computing system comprising:
   an interface for receiving source datasets relating to a source domain and a target dataset relating to a target domain of interest, wherein each dataset is arranged in a tabular format comprising columns that correspond to features of the dataset and rows that correspond to instances of the dataset, wherein the source datasets and the target dataset comprise a same feature space, and wherein each source dataset is paired with the target dataset as part of a source-target dataset pair;
   a processor; and
   a computer-readable storage medium storing program instructions that direct the processor to:
      pre-process each source-target dataset pair to remove any non-intersecting columns;
      calculate at least two of a dataset similarity score, a row similarity score, and a column similarity score for each source-target dataset pair; and
      summarize the at least two of the dataset similarity score, the row similarity score, and the column similarity score for each source-target dataset pair to identify at least one source dataset that is most similar to the target dataset, wherein the program instructions direct the processor to perform the summarization by:
         finding a summarization statistic of the at least two of the dataset similarity score, the row similarity score, and the column similarity score for each source-target dataset pair; and
         outputting the summarization statistic as an overall similarity score for each source-target dataset pair.

11. The system of claim 10, wherein the computer-readable storage medium stores program instructions that direct the processor to train a classification model for the target domain via a transfer learning process that utilizes the at least one source dataset that is most similar to the target dataset.

12. The system of claim 10, wherein the computer-readable storage medium stores program instructions that direct the processor to further pre-process each source-target dataset pair to perform at least one of:
    filling missing values within each source-target dataset pair:
    removing any irrelevant or unimportant columns from each source-target dataset pair,:
    aligning the source dataset and the target dataset within each source-target dataset pair to provide the columns of the source dataset and the columns of the target dataset arranged in a same order; and
    standardizing values within each source-target dataset pair.

13. The system of claim 10, wherein the computer-readable storage medium stores program instructions that direct the processor to perform feature selection for each source-target dataset pair prior to calculating the at least two of the dataset similarity score, the row similarity score, and the column similarity score for each source-target dataset pair.

14. The system of claim 13, wherein the computer-readable storage medium stores program instructions that direct the processor to perform feature selection for each source-target dataset pair by:
    iteratively performing the following for each source-target dataset pair until a predetermined number of best-splitting columns have been removed from the source-target dataset pair:
        training a machine learning model to differentiate between the source dataset and the target dataset within the source-target dataset pair;
        identifying one or more most important features for the machine learning model, wherein each of the one or more most important features corresponds to a best-splitting column within the source-target dataset pair; and
        removing the one or more best-splitting columns corresponding to the one or more most important features from the source-target dataset pair; and
    identifying the remaining columns within each source-target dataset pair as the selected features.

15. The system of claim 10, wherein the computer-readable storage medium stores program instructions that direct the processor to calculate the dataset similarity score for each source-target dataset pair by:
    iteratively performing the following for each source-target dataset pair until a predetermined number of best-splitting columns have been removed from the source-target dataset pair:
        training a machine learning model to differentiate between the source dataset and the target dataset within the source-target dataset pair;
        identifying one or more most important features for the machine learning model, wherein each of the one or more most important features corresponds to a best-splitting column within the source-target dataset pair; and
        removing the one or more best-splitting columns corresponding to the one or more most important features from the source-target dataset pair;
    determining an overall accuracy of the machine learning models that were generated during each iteration for each source-target dataset pair; and
    calculating the dataset similarity score for each source-target dataset pair, wherein the dataset similarity score is equal to 1 minus the overall accuracy of the machine learning models, and wherein dataset similarity scores closer to 1 indicate that the source dataset and the target dataset are more similar.

16. The system of claim 10, wherein the computer-readable storage medium stores program instructions that direct the processor to calculate the row similarity score for each source-target dataset pair by:
    calculating a distance score between each instance of the target dataset and each instance of the source dataset by performing a clustering-based optimization process;
    summarizing the distance scores to find an average minimum distance score for the source-target dataset pair; and
    outputting the average minimum distance score as the row similarity score for the source-target dataset pair.

17. The system of claim 10, wherein the computer-readable storage medium stores program instructions that direct the processor to calculate the column similarity score for each source-target dataset pair by:
    building a value distribution approximation for each column within the source dataset and each column within the target dataset;
    comparing the value distribution approximations for corresponding columns within the source dataset and the target dataset using a similarity function, wherein an output of the similarity function is a similarity score for each corresponding column; and
    summarizing the similarity scores for the corresponding columns to find the column similarity score for the source-target dataset pair.

18. The system of claim 10, wherein the program instructions direct the processor to find the summarization statistic of the at least two of the dataset similarity score, the row similarity score, and the column similarity score for each source-target dataset pair by:
    finding a sum, a mean, a median, a maximum, a weighted average, or an aggregation of the at least two of the dataset similarity score, the row similarity score, and the column similarity score for each source-target dataset pair; and
    outputting the sum, the mean, the median, the maximum, the weighted average, or the aggregation as an overall similarity score for each source-target dataset pair.

19. A computer program product, comprising a computer-readable storage medium having program instructions embodied therewith, wherein the computer-readable storage medium is not a transitory signal per se, and wherein the program instructions are executable by a processor to cause the processor to:
    receive source datasets relating to a source domain and a target dataset relating to a target domain of interest, wherein each dataset is arranged in a tabular format comprising columns that correspond to features of the dataset and rows that correspond to instances of the dataset, wherein the source datasets and the target dataset comprise a same feature space, and wherein each source dataset is paired with the target dataset as part of a source-target dataset pair;
    pre-process each source-target dataset pair to remove any non-intersecting columns;
    calculate at least two of a dataset similarity score, a row similarity score, and a column similarity score for each source-target dataset pair; and
        summarize the at least two of the dataset similarity score, the row similarity score, and the column similarity score for each source-target dataset pair to identify at least one source dataset that is most similar to the target dataset, wherein the program instructions cause the processor to perform the summarization by:
    finding a summarization statistic of the at least two of the dataset similarity score, the row similarity score, and the column similarity score for each source-target dataset pair; and
    outputting the summarization statistic as an overall similarity score for each source-target dataset pair.

20. The computer program production of claim 19, wherein the program instructions are executable by a processor to cause the processor to perform feature selection for each source-target dataset pair prior to calculating the at least two of the dataset similarity score, the row similarity score, and the column similarity score for each source-target dataset pair.

* * * * *